May 10, 1955

W. A. RHODES 2,707,863

MERCURY TURBINE POWER UNIT GENERATOR

Filed Nov. 9, 1953

*INVENTOR.*
WILLIAM A. RHODES
BY Scott L. Norviel
atty

May 10, 1955 W. A. RHODES 2,707,863
MERCURY TURBINE POWER UNIT GENERATOR
Filed Nov. 9, 1953 2 Sheets-Sheet 2
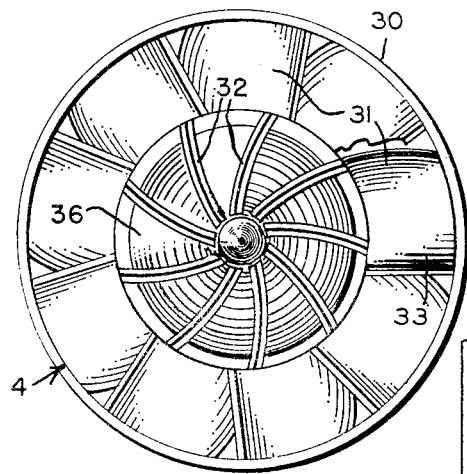
FIG. 4
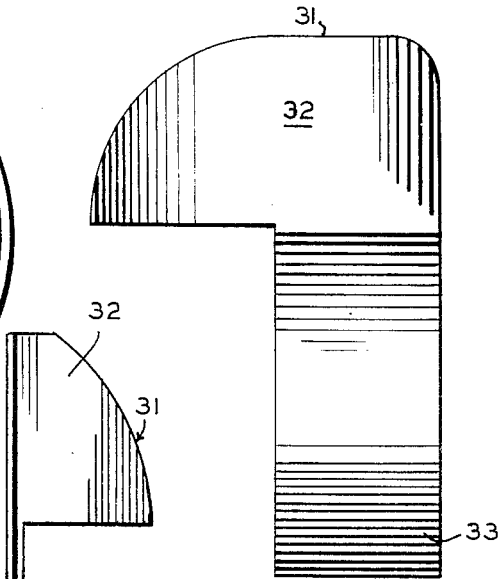
FIG. 5
FIG. 8
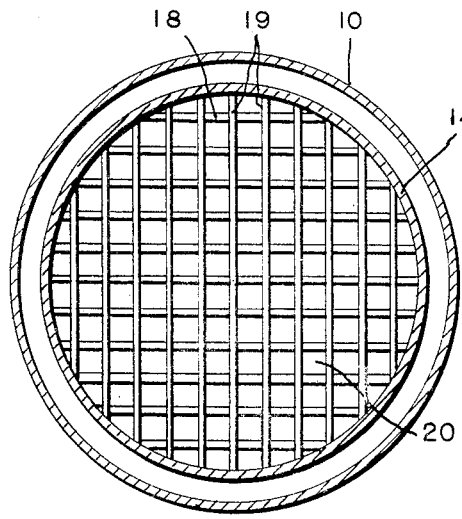
FIG. 7
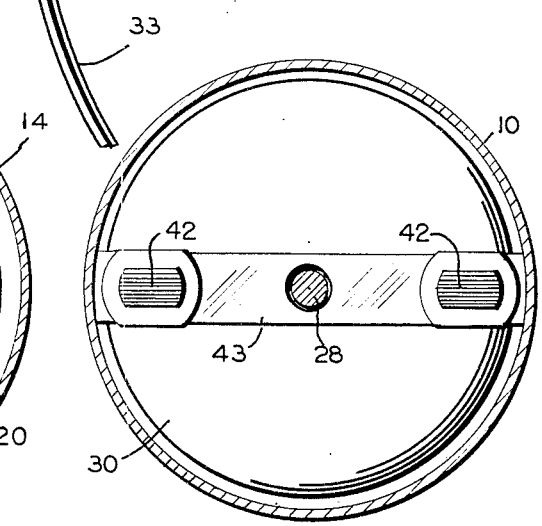
FIG. 6
*INVENTOR.*
WILLIAM A. RHODES
BY Scott L. Norvell
atty United States Patent Office 2,707,863
Patented May 10, 1955

2,707,863

MERCURY TURBINE POWER UNIT GENERATOR

William A. Rhodes, Phoenix, Ariz.

Application November 9, 1953, Serial No. 391,061

3 Claims. (Cl. 60—36)

This invention concerns unitary thermal energy conversion devices.

One of the objects of the invention is to provide a unit construction wherein a completely enclosed mercury vapor turbine drives an electrical generator and/or drives a shaft outside the enclosing container through a magnetic clutch.

Another object is to provide a completely enclosed prime mover and thermal energy conversion device wherein heat is applied to the bottom of the containing case and either electrical energy or mechanical energy may be obtained from mechanism in the opposite end of the containing case.

Another object is to provide a thermal energy conversion device wherein a mercury boiler provides mercury vapor for a closely adjacent turbine, both arranged within a containing case so that the vapor from the mercury passes at low pressure, but at high velocity, directly from the boiler to the turbine and thence to portions of the outer walls of the container where the mercury vapor is cooled and condensed to afford a rapid and efficient cycle for the conversion of thermal energy to other forms of usable energy.

Still another object is to provide a highly efficient and self contained thermal energy converter having a minimum number of moving parts wherein heat applied thereto is converted into electrical power and/or mechanical motion.

Other objects will appear hereinafter.

I attain the foregoing objects by means of the devices, construction, and combinations shown in the accompanying drawing in which—

Figure 4 is a bottom view of the turbine hood and turbine rotor;

Figure 5 is a side elevation of the turbine element;

Figure 6 is a sectional view of the generator stator taken on line 6—6, Figure 1;

Figure 7 is a horizontal sectional view of the boiler taken substantially on line 7—7 of Figure 1; and Figure 8 is a vertical edgewise view of one of the turbine blades.

Similar numerals refer to similar parts in the several views.

Figure 3:
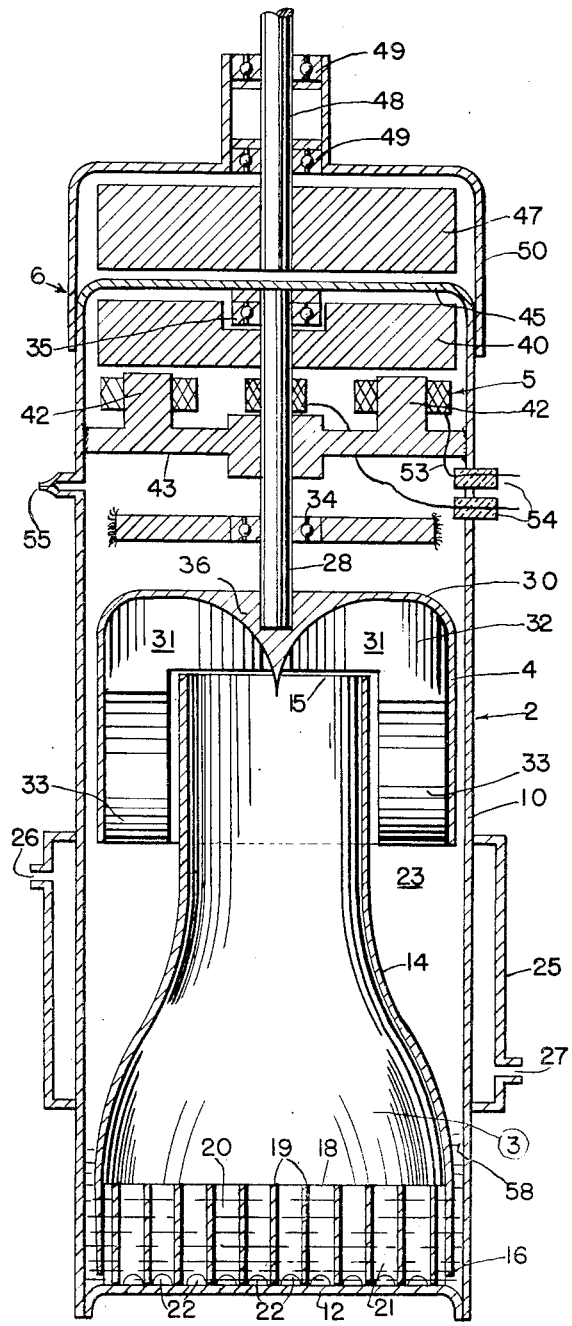
Figure 3 is a vertical sectional view thereof, taken substantially on line 3—3 of Figure 2 and drawn on an enlarged scale.
Figure 1:
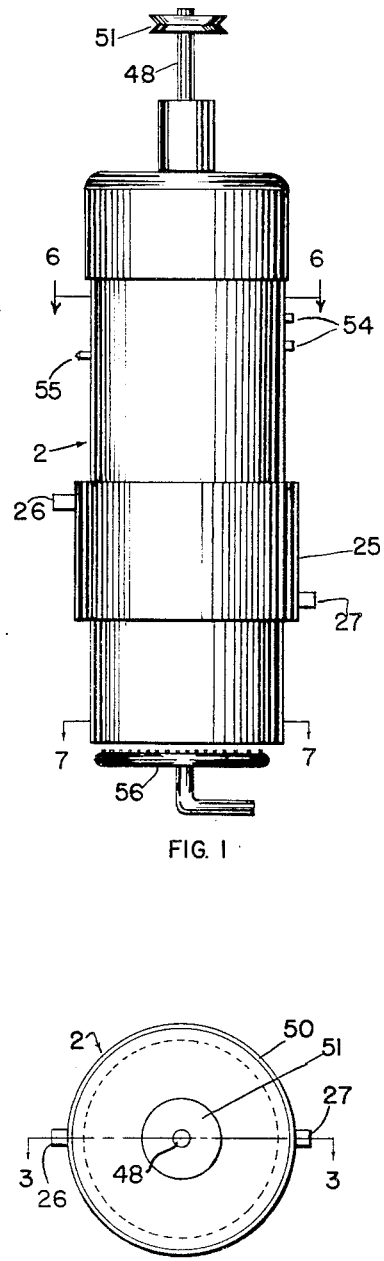
Figure 1 is a side elevational view of my turbine power unit device.
Figure 2:
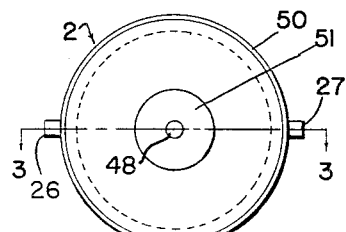
Figure 2 is a top plan view thereof.

Referring to the drawing, 2 indicates the entire thermal energy conversion unit, 3 indicates the boiler in general, 4 the turbine rotor, 5 the electric generator, and 6 the magnetic clutch at the top of the unit.

Within the case 10 there is a cylindrical mercury boiler 3 within its bottom portion which includes the bottom plate 12 of the case, the lower side walls thereof, and a conical chimney 14.

This chimney terminates at the top with a throat 15 and with a skirt 16 at its bottom. The skirt is circular and concentrically follows the contour of the inner face of the boiler. The bottom edge of the skirt is held a short distance above the bottom plate of the boiler.

On the bottom plate of the boiler and within the area enclosed by the skirt there is a grid-like cellular structure consisting of parallel, equally spaced plates 18 and parallel, equally spaced transverse strips 19, which form cells 20. The lower edges of the plates 18 and 19 are notched at 22 to permit free flow of mercury beneath them into cells 20. The edges are attached to the upper face of the bottom 12 of the boiler by welding at intervals. This cellular structure provides a heat transfer surface which is in addition to the upper face of the bottom plate 12 of the boiler. This structure aids in bringing heat from beneath the bottom of the boiler into contact with mercury 21 which is in the bottom portion of the boiler. The plates of the cellular structure also function as baffles to keep the mercury 21 from surging from one side of the boiler to another when it is subject to sudden motion.

The annular area indicated by numeral 23, surrounding the central portion of the chimney and between its outer surface and the inner face of the boiler side constitutes a condensing well.

On the outside of the boiler side wall adjacent and above the condensing well there is a water jacket 25, having an inlet nipple 27 and an outlet nipple 26. A water supply pipe is connected to the inlet to circulate water through the jacket.

Above the throat of the boiler a turbine 4 is mounted on shaft 28. This consists of a domed hood 30 in the axial center of which the upwardly extending shaft 28 is attached. Within this hood there are a number of radially extending turbine fins or blades 31. These are attached to the inner walls of the hood with their outer edges following its inner contour. Their upper portions 32 are positioned angularly relative to true radial lines projected from the axis of the hood and are curved in a plane transverse to said axis so as to give rotary motion to the hood as mercury vapor flows radially between them from the chimney throat. Their outer and lower portions 33 are curved in a vertical plane and directed away from the desired direction of rotation. Mercury vapor flowing downwardly between the outer portions of the fins assists in producing the rotary motion desired.

Centrally of the inner face of the top of the hood there is a conical directive boss 36 which spreads vapor issuing upwardly from chimney 15 and directs it radially outward against the upper portions 32 of the fins 31.

The lower edges of the fins are in the same plane as the outer edge of the hood. Their inner edges are shaped to follow the outer contour of the upper portion of the chimney. While, for the purpose of illustration, only one blade is shown in Figure 4, it is to be understood that any number of closely and evenly spaced fins or blades are to be annularly positioned within hood 30.

Shaft 28 is supported on two axially positioned bearings 34 and 35 within the upper portion of housing case 10. These bearings are positioned so that the turbine 4, the shaft 28, and the electrical generator 5 are centrally and axially located within this upper portion of the case, directly above boiler 3.

The electrical generator 5 includes a rotor 40 composed of a permanent magnet affixed to the upper end of shaft 28. The poles of the magnet are diametrically spaced and rotate in close proximity to the core pieces 42 of the generator stator 43. The upper faces of generator rotor magnet may operate in close proximity to the upper end plate 45 of the cylindrical casing 10. This upper end plate is made of non-magnetic material of the type having low hysteresis losses. Rotary motion is magnetically communicated to armature 47 on vertical power takeoff shaft 48, which is journalled outside case 10. Shaft 48 is supported on bearings 49 in case cap piece 50. A driving pulley 51 is attached to the top of shaft 48. For the purposes here concerned, the relation between rotor 40 and armature 47 may be considered that of a magnetic clutch.

Electric leads 53 are brought out from the generator stator windings through insulating bushings 54.

With the interior parts, above mentioned, installed, and with a quantity of mercury 20 deposited in the boiler bottom, the case is evacuated and sealed by closing tube 55.

In operation, heat is applied to the bottom of the case 10 by gas burner 56, and condensing water is circulated through water jacket 25 cooling the side walls of the case adjacent condensing well 23. Mercury is vaporized and its vapor ascends chimney 14, is spread by conical boss 36, and flows radially and then axially downward through the spaces between the blades 31 in hood 30. In its radial flow it contacts the curved upper portions 32 of turbine blades 31 and during its downward flow it contacts the curved lower portion 33 of these blades. The blades are curved and slanted, as above explained, so that rotary motion is imparted to the hood, its shaft, and rotor 40. The upper portion 31 of the blades may be curved clockwise radially and outwardly, thus imparting counterclockwise rotation to the hood, and the lower portions of the blades may be curved and directed clockwise to enhance the rotary effect.

Motion of the magnetic field of armature 40 over stator 43 generates alternating current which can be drawn off through leads 53, and power transmitted by magnetic attraction to armature 47 may be obtained from pulley 51.

It is to be understood that the turbine operates by reason of the reaction of the heavy mercury vapor flowing in vacua at high velocity and impinging on the blades 31. The weight of this vapor together with its velocity makes the device attain a comparatively high degree of efficiency. By condensing the mercury vapor in the annular area 23, adjacent the cooled inner faces of the outer walls of the case 10, rapid circulation is assured, and velocity of circulation through the system is assured.

As the mercury reliquefies it drops into an annular hot well 58 where its level is maintained somewhat above that of the mercury in the central portion of the boiler under hood 14.

It is to be noted that heat is communicated, not only from the inner surface of the case bottom 12, but from the side faces of plates 18 and 19. This structure aids in the rapid transfer of heat from the flame of burner 56 to the liquid mercury.

In addition to this, efficiency is gained by positioning the turbine rotor immediately above the chimney throat, and by condensing the mercury vapor immediately below the rim of the turbine rotor. The travel of the mercury is therefore in a short cycle and there is no loss due to piping and flow and cornering friction. This downward friction also creates a negative pressure around the annulus of the turbine hood which prevents vapor from flowing into or condensing in the upper portion of the case to any appreciable extent.

While I have specified that mercury is used as a vapor forming fluid element, it is to be understood that other vaporizable fluids may be substituted. Thus certain heavy hydrocarbons that do not break down at the temperatures involved, and also certain silicones may be used instead of the mercury.

I claim:

1. A thermal energy conversion device comprising a cylindrical containing case having a flat bottom plate and a top plate of non-magnetic material, means for applying heat to the bottom thereof, a mercury boiler in the bottom thereof including a chimney having an upwardly directed throat at its top and a skirt at its bottom spaced above the bottom of said case, a water jacket on said case cooling the outer walls thereof adjacent the middle portion of said chimney forming an annular condensing area between the outer walls of said chimney and the inner walls of said containing case, an annular hot well formed therebelow between the outer walls of the skirt portion of said chimney and the inner wall of said case, means for exhausting air from said case, a turbine consisting of a domed hood having curved radial blades therein, extending over the throat of said chimney and supported on an axially extending shaft journalled in the upper portion of said case, a generator rotor composed of a magnet having its poles radially positioned relative to said shaft attached to the upper portion of said shaft and rotating adjacent the upper end plate of said case, a generator stator positioned below said rotor having pole pieces closely adjacent the poles of said rotor, windings on said pole pieces having their leads brought out through the walls of said case through vapor tight insulators, and an armature of magnetic material mounted on a shaft having a pulley axially aligned with said shaft on said turbine rotor and journalled in a cap attached to the top of said case.

2. In a thermal energy conversion device having a gas tight enclosing case having top and bottom plates, a vertically operating turbine rotor mounted on a vertically journalled shaft within the upper portion of said case, and a generator rotor mounted on said shaft above said turbine rotor generating electric current by cooperation with a stator fixed within said case; a mercury boiler within the lower part of said case including parallel crossing plates attached to the bottom plate of said case, having notched lower edges for circulation of mercury and providing heating surfaces in addition tto said case bottom, a vertically extending conical chimney, having a skirt at the bottom spaced a short distance above said case bottom and a throat of lesser diameter at its top positioned to discharge mercury vapor directly onto said turbine rotor, a water jacket surrounding said case cooling the outer wall of said case below said turbine and forming an annular mercury condensing area adjacent the inner wall face of said case below said turbine and above the skirt of said chimney, an annular mercury hot well formed above the bottom of said case and surrounding the lower portion of said chimney, and means for heating the bottom of said case and vaporizing mercury contained in the bottom portion thereof.

3. In a thermal energy conversion device including an exhausted gas tight cylindrical containing case having a flat bottom plate and a flat top plate of non-magnetic material, an axially positioned vertical shaft journalled in the upper portion thereof, carrying a rotor consisting of a permanent magnet having its poles diametrically spaced, a mercury turbine on the lower end of said shaft consisting of a hood having a circular top centrally attached to said shaft and a downwardly extending side wall, a centrally positioned conical vapor distributing boss on the inner face of said hood top and a plurality of spaced turbine blades extending radially outward from said boss within said hood and downward within said hood side wall, curved radially and vertically to impart rotary motion to said hood by the radially outward and downward flow of mercury vapor between them, and means for rapid cyclic vaporization and condensation of mercury within the lower portion of said case including a mercury boiler composed of the bottom plate of said case, a conical chimney centrally positioned within said case having a skirt adjacent its lower edge positioned above said bottom plate and a throat of lesser diameter than said skirt disposed centrally within said turbine hood and centrally including said conical boss therein, a water jacket on the outside of said case cooling the walls thereof adjacent the lower edge of said turbine hood and providing an annular condensing area adjacent the inner faces of said wall portions and extending downward to the annulus of said chimney skirt, an annular mercury hot well formed between said chimney skirt and the bottom portion of the side wall of said case, and a vaporization area within the skirt portion of said chimney and above said case bottom plate, means for applying heat externally to the said bottom plate of said case, an outside cap piece attached to the top of said containing case, journaling a vertical power take-off shaft aligned with said shaft journalled in said case, having a power take-off pulley at its upper end and an armature of magnetic material on its lower end revolving in close proximity tto and driven by the revolving magnetic field of said rotor on the upper end of said shaft journalled within said containing case.

References Cited in the file of this patent

UNITED STATES PATENTS

| | | |
|---|---|---|
| 1,804,694 | Jones | May 12, 1931 |
| 2,495,745 | Litton | Jan. 31, 1950 |
| 2,576,284 | Crocchi | Nov. 27, 1951 |